Aug. 10, 1937.    W. FREEMAN    2,089,914
CONTROL COMPASS FOR AUTOMATIC PILOTING OF MOVING BODIES
Filed July 10, 1935

Wood Freeman
INVENTOR

Patented Aug. 10, 1937

2,089,914

UNITED STATES PATENT OFFICE 2,089,914

CONTROL COMPASS FOR AUTOMATIC PILOTING OF MOVING BODIES

Wood Freeman, Fircrest, Wash.

Application July 10, 1935, Serial No. 30,723

7 Claims. (Cl. 33—204)

The object of my invention is to provide means whereby a magnetic compass may act as a medium for the control of a current in an electric circuit, said current in turn actuating mechanism performing the afore-mentioned piloting.

In this invention I have made use of the principle of a direct contact closure operated by the magnetic element of a magnetic compass, to complete an electrical circuit for controlling the operation of the steering mechanism of a vessel. This idea is in itself not novel, inasmuch as it has been the subject of numerous prior applications and patents. There appears to have been, however, a serious difficulty with former inventions of this nature, inasmuch as there was always present the danger of the contacts sticking, coupled with the inability of the magnetic element of the compass to give sufficient pressure to make the proper contact without greatly disturbing the directional qualities of the compass. Various methods have been suggested to overcome these defects, among which were the employment of mercury contacts.

In making experiments with liquid compasses for controlling the steering mechanism of a vessel I conceived the idea that if it were possible to make a contact operating only one way so that any pressure exerted by the needles of the compass thereon would tend to always produce deviation in one direction, and if that pressure could be kept with a constant average, and if, provided the current employed could be kept to such a minimum that there would be no tendency to stick the contacts, either by reason of arcing or electrical attraction, then it would seem feasible to make a magnetic compass satisfactorily perform the task of controlling the mechanism for steering a vessel; by using the direct contact closure means.

Figure 2:
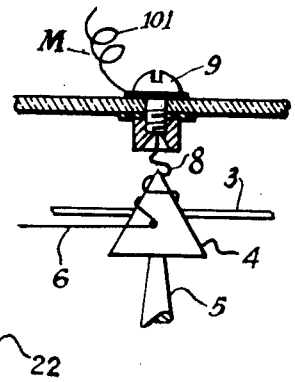
Figure 3:
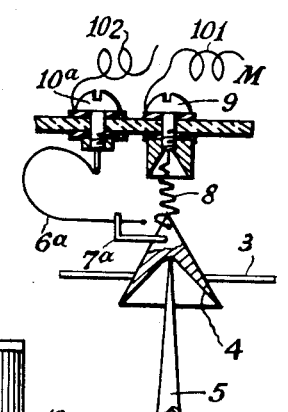
Figure 1:
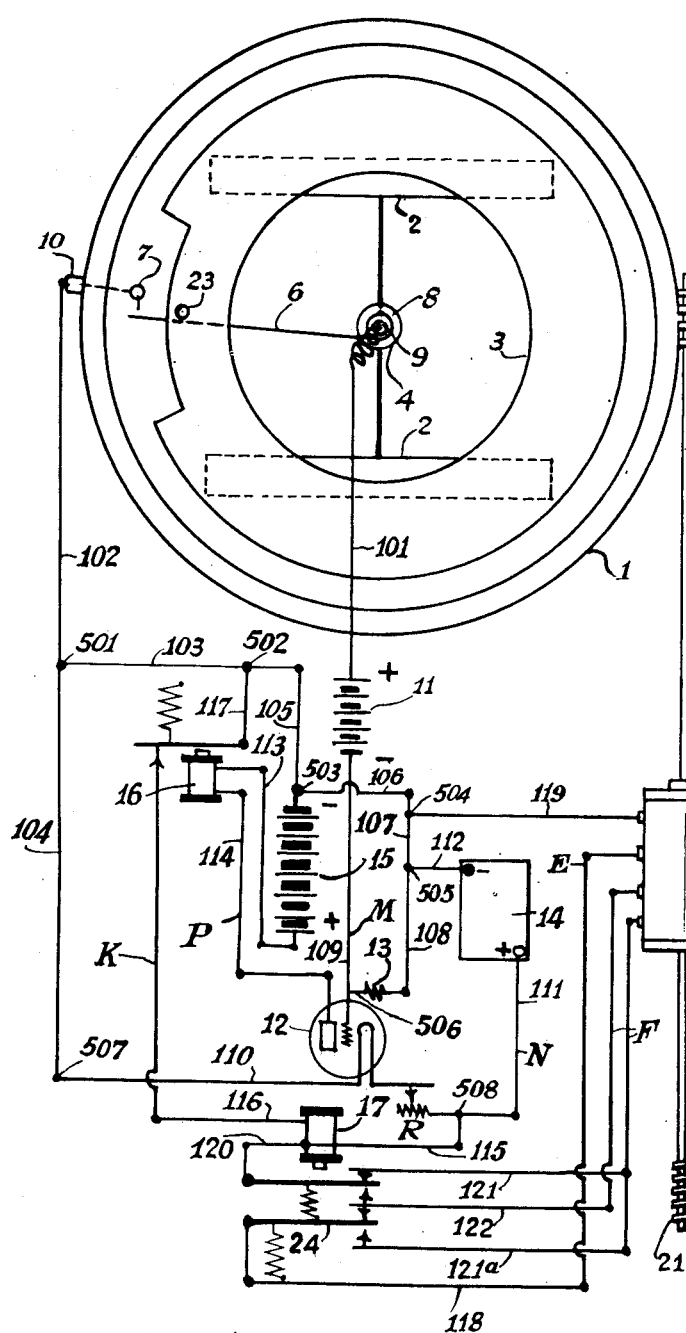

I have attained this result by means of the following described devices in which, referring to the accompanying drawing, Fig. 1 shows a general outline of the compass, together with a schematic connecting electrical circuit, together with an illustrative manner of mechanically operating the steering mechanism. Fig. 2 shows a detail of the compass card mounting and connecting devices. Figure 3 shows a modification in which the cat-whisker is attached to the glass of the compass bowl, 6a being the cat-whisker and 7a being the contact member attached to the magnetic element. Similar numerals refer to similar parts throughout the drawing.

The liquid filled compass bowl 1, carries a pivot 5, upon which is suspended upon a jewel mounting 4, the compass card 3, to which is attached the magnetic element 2. Attached to the framework which carries the compass card, and at a slight distance to one side of the center is the "cat-whisker" contact 6, said cat-whisker extending horizontally a sufficient distance to make contact with the stationary contact 7, which is attached to the bowl of the compass, said contact being electrically connected with the exterior binding post 10. The compass card is cut away at one side for a distance of about 40°, which allows the compass to have that amount of free swing, the ends of the notch forming with the stationary contact, a stop which limits the swing of the compass card. The cat-whisker normally occupies a central position with regard to the notch. As before mentioned, the cat-whisker is slightly offset so that, as the compass swings with the contact made, the said cat-whisker will tend to lengthen to compensate for the bending produced in said cat-whisker, and thereby prevent the end of the cat-whisker from slipping past the stationary contact. A fine coil spring 8, is placed in the top of the jewel mounting 4, and connects with binding post 9, which is centrally located in the glass top of the compass casing. The electrical circuit M, which includes a source of electrical energy 11, the grid of a thermionic valve 12, and a grid leak 13, is connected to the binding posts 9 and 10, of the compass and completes the circuit through the cat-whisker and stationary contact. The electrical circuit N, includes a source of electrical energy 14, a rheostat R, and the filament of the thermionic valve 12. The electrical circuit P, includes a source of electrical energy 15, a relay 16, and the plate of the thermionic valve 12. The contacts of relay 16 complete circuit K, which includes source of current 14, and a standard type of reversing relay 17, for controlling the direction of rotation of the motor 18. The motor 18, operates in either direction and is geared by suitable driving mechanism to the steering mechanism, as through the worm gearing 21, and to the compass casing, as through the worm gearing 22.

In order that the circuits may be described in more detail I shall trace same, from one side of the source of supply, through the elements in the circuit, to the other side of the source of supply. Beginning with circuit M, at the plus sign, or positive side of the source of electrical energy 11, through conductor 101, to the binding post 9, in the top of the compass, traversing said binding post and on through the coil spring 8, to the cat-whisker 6, through said cat-whisker, and through the contact made by said cat-whisker with stationary pin 7, located on the inside of the compass bowl 1, the said compass bowl acting as a conductor to the binding post 10, located on the outside of the aforesaid compass bowl, from thence through conductor 102, to junction point 501, where the circuit divides, one branch following conductor 103, and the other following 104. Tracing the branch following 103, successively through junction points and conductors, 502, 105, 503, 106, 504, 107, 505, 108, through grid leak (high resistance) 13, reaching conductor 109, at junction point 506. Junction point 506, joins the grid terminal of thermionic valve 12, with grid-leak 13, and also conductor 109, the other end of said conductor 109, being joined to the negative side or minus sign of electrical energy source 11. Tracing the part of the circuit following 104, from 104, through junction 507, and by conductor 110, to the negative terminal of the filament circuit of the thermionic valve 12, from whence by electronic transmission between the said filament and the grid of said thermionic valve thence by way of the grid and conductor 109, to the aforementioned negative terminal of source of electrical energy 11.

Tracing circuit N, beginning at the plus sign or positive side of source of electrical energy 14, by conductor 111, to junction 508, to which junction is connected variable resistance R, through said resistance to the positive terminal of the filament of thermionic valve 12, through said filament to the negative terminal of said filament on said thermionic valve, thence by conductor 110, to junction 507, from whence successively through, conductors and junctions, 104, 501, 103, 502, 105, 503, 106, 504, 107, 505, 112, which last conductor 112, connects with the negative side of source of electricity 14.

Tracing circuit P, beginning at the plus sign or positive side of source of electrical energy 15, by conductor 113, to one terminal of the energizing winding of relay 16, through said energizing winding to the other terminal and from thence by conductor 114, to the plate terminal on the thermionic valve 12, and through the said thermionic valve by electronic transmission between the plate and filament of said thermionic valve to the negative terminal of the filament on said thermionic valve, and from thence successively by conductors and junctions, 110, 507, 104, 501, 103, 502, 105, which said last conductor 105, joins junction 503, which joins the negative side or minus sign of source of electrical energy 15.

Tracing circuit K, beginning at the positive side or plus sign of source of electrical energy 14, by conductor 111, through junction 508, by conductor 115, to, and through the energizing winding of relay 17, then by conductor 116, to the contact at relay 16, through said contact and by conductors and junctions, 117, 502, 105, 503, 106, 504, 107, 505, 112, the last named conductor 112, making contact with the negative terminal of source of electrical energy 14.

Circuits E, and F, are the armature and field circuits of the motor, said motor performing the function of orienting the bowl of the compass with respect to the magnetic needles and also actuating the rudder at the same time. The said motor shown is of the conventional series wound type with the reversing switch in the field circuit, but any type of reversing motor may be substituted therefore.

Tracing circuit E, beginning at the plus sign or positive side of source of electrical energy 14, by conductor 111, through junction 508, through conductors 115, 120, through switch 24, and conductor 121, through the field windings of the motor 18, returning to switch 24, via conductor 122, from thence through conductor 118, through the armature windings of the motor 18, returning via conductor 119, junction 504, conductor 107, junction 505, and conductor 112, joining the negative side of the source of energy 14. With the reversing switch 24, in the opposite position the circuit will lead via 122, and return via 121a.

Tracing circuit F, beginning at the reversing switch 24, via 121, through the field windings of the motor returning via 122, to reversing switch 24. Or if the switch be in the reverse position then via 122, through the field windings of motor 18, returning via 121a.

Inasmuch as the directive force of a magnetic compass is very small when it is on or near the north and south heading, it is essential that any contact pressure which is applied must be very minute in character in order to not cause too great a deviation of the compass. If, however, the pressure is always applied on one side so that the deviation is always in one direction, the error may be compensated for without serious difficulty. In order that the contact pressure may be steady and not cause the magnetic element to rebound unduly, I have employed the novel feature of a very limber contact member, of the "cat-whisker" type. I have found that by using a wire of Number 40 gauge (B. & S.) or finer, the desired results may be obtained. I employ a stationary contact with a narrow edge on the side which contacts the cat-whisker (the actual thickness of this edge being less than one thousandth of an inch) and, as the stationary contact is transverse to or tangent to the cross section of the cat-whisker, the actual area of contact is thereby rendered exceedingly small. By keeping the area small a less pressure is required to make a perfect electrical contact.

In order that the current which flows through the exceedingly small contact shall at all times be kept to the minimum I employ the grid of a thermionic valve in the circuit, together with a "C" battery, the negative side of which is connected to the said grid. A grid leak of from two to five megohms is employed to allow the negative charge to leak off the grid when the cat-whisker contact is broken. Since little or no current flows in the grid circuit when the grid is negative, there will be almost no current flowing through the cat-whisker contact in the compass when said contact is made. The greatest amount of current which will be flowing at any time in the compass circuit M, being only the small amount allowed to pass through the high resistance grid leak 13.

In order that there be no leakage of current through the liquid, the compass employed is of the oil filled type. Since there is no appreciable current flowing at any time and hence no electrolysis, the cat-whisker may be made of any suitable conducting material having sufficient resiliency to always return immediately to its normal position when the contact is broken. In order to insure a positive position of rest for the cat-whisker, a stop pin 23, is provided, said stop pin being attached to the compass card.

A variation of the foregoing arrangement may be made by attaching the cat-whisker to the bowl or to the pivot and making the vertical contact fast to the compass card and in this case the stop may be attached to the bowl of the compass.

The operation of my invention is as follows:—

Assume a situation as illustrated in the drawing Fig. 1, assuming further that the system is energized, motor 18, will be rotating in the direction to cause the rudder stock to turn clockwise, and to turn the compass bowl counter clockwise, bringing the cat-whisker and stationary contact together. As soon as a contact is made between the cat-whisker and the stationary contact, the grid of the thermionic valve will become negative with respect to the plate, the plate current will cease and the armature of relay 16, will be released opening circuit K, which in turn will release the armature of relay 17, allowing the reversing switch to reverse the direction of the motor. The motor now causes rotation of the compass bowl in a clockwise direction which separates the cat-whisker and stationary contact. When the cat-whisker and stationary contact are separated, the potential is no longer applied to the grid of the tube, the grid leak allowing the accumulated charge to pass off, the plate current will immediately flow sufficiently to close relay 16, and the cycle is complete.

Should the vessel veer from its course, the motor will at all times keep the stationary contact and cat-whisker in close proximity so that the bowl will have directional qualities comparable to that of the magnetic element, the rudder having simultaneously corresponding opposite angular directional qualities to that of the bowl of the compass. In normal operation, the motor is continuously operating in one direction or the other without any neutral point or dwell, the cat-whisker and stationary contact making and breaking many times per minute. Any deviation in direction of the magnetic element produced thereby will be constant and will not affect the final course of the vessel.

The pressure applied to the magnetic element by reason of the contacts tends to displace the magnetic element in one direction only. The greater the displacement the greater will be the pressure exerted upon the contact surfaces, up to the maximum which it is possible for any given magnetic element to deliver when it has been displaced to a position 90° from the magnetic meridian. In my invention there is no noticeable displacement of the magnetic element because of the exceeding flexibility of the cat-whisker. In actual practice I have found that the cat-whisker will bend as much as four degrees to displace the magnetic element one degree from the meridian, and since the instant the contact is made, the mechanism starts the contacts to separate again, there is but slight tendency to cause the displacement of the magnetic element.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. The combination a magnetic compass, having a casing bearing a fixed contact type electrode, a magnetic element pivotally supported in said casing and bearing a flexible cat-whisker contact electrode positioned so that the cat-whisker contacts the fixed electrode completing an electrical circuit through a thermionic valve grid element, a grid leak and source of electric energy as the casing of said compass is rotated in one direction with respect to said magnetic element, stop members adapted to limit the movement of said magnetic element with respect to the said casing, a stop member on said magnetic element to limit the movement of said cat-whisker with respect to the said magnetic element.

2. A navigating device comprising a liquid filled compass having a pair of internal contact members, said contact members forming a single contact with each other, one or both of said contact members being of the flexible cat-whisker type, one of said contact members being attached to the casing of said compass and the other to the magnetic element thereof, an electrical circuit connected in series with said contact members, said electrical circuit including a source of electrical energy a thermionic valve having a grid element, a grid leak in shunt with said grid element said grid leak being in series with and completing the circuit through said compass, cat-whisker and other contact member, said electrical circuit controlling operative mechanism whereby, when the said contact members make contact, the mechanism is set in motion which immediately separates the contact members, and when the contact members are separated the mechanism is immediately set in motion to make said members contact.

3. The combination, a magnetic compass, having a casing bearing a contact member, a magnetic element pivotally supported in said casing said magnetic element bearing a flexible cat-whisker contact member, said cat-whisker contact member being so positioned as to engage the contact member on said casing as the said casing is rotated in one direction with respect to said magnetic element, thereby completing an electrical circuit including a source of electrical potential, a grid leak and a grid element of a thermionic valve in series with said contacts in said compass said circuit, controlling a plate circuit from the aforementioned thermionic valve said plate circuit including a source of electrical current and a relay.

4. The combination, a magnetic compass having a casing, bearing a contact member, a magnetic element pivotally supported therein, bearing a flexible, cat-whisker contact member, being so positioned as to engage the contact member on the casing, as the casing is rotated in one direction with respect to the magnetic element, thereby completing an electric circuit having through a source of electrical potential whose positive pole connects one of the contacts on the said compass casing and the negative pole of said electrical potential connects to the grid of a thermionic valve, and a bypass grid leak connecting the said grid to the common ground return, said common ground return being joined electrically to the remaining contact on the compass, said electrical circuit controlling a plurality of electrical circuits by means of the grid bias of said thermionic valve said plurality of circuits contributing to operate mechanism which orients the said compass casing in such a manner that the said contact member in said casing and the said cat-whisker are in constant proximity to each other, making contact immediately upon breaking same and in turn breaking said contact immediately upon making same.

5. The combination, a magnetic compass having a single internal electrical contact, one member of said contact being an electrical conductor having the flexible characteristics of a cat-whisker, said contact being closed by the rotation of the compass casing in one direction with respect to the magnetic element, the closing of said contact completing an electrical circuit through a vacuum tube and the grid element thereof, and a source of electrical energy, said closing of said contact contributing to cause the grid of said vacuum tube to assume a negative bias with respect to the plate of said tube.

6. The combination of a navigating device having a directional element suitably mounted therein and an electrical contact operated by said device, one of the members of said contact being an electrical conductor having flexible characteristics similar to a cat-whisker, said contact upon closing completing an electrical circuit through a source of electrical energy and a vacuum tube and the grid element thereof, the operation of the aforesaid circuit controlling one or more other electrical circuits, said last named circuits operating means which moves said device in such a manner as to break the said contact when made, and again make the contact when said contact is broken.

7. The combination, a magnetic compass having a casing bearing a fixed contact member, a magnetic element pivotally supported in said casing, a flexible cat-whisker contact member mounted on said magnetic element in such a position that the said cat-whisker contacts said fixed member as the casing of said compass is rotated in one direction with respect to said magnetic element, a source of electrical potential, a thermionic valve having a grid element, a grid leak in shunt with said grid element, said grid leak being in series with and completing the circuit through said compass cat-whisker and fixed electrode.

WOOD FREEMAN.